May 23, 1939.　　　　J. L. DAVIS　　　　2,159,552
ADJUSTABLE LAWN MOWER SHARPENER
Filed April 26, 1938
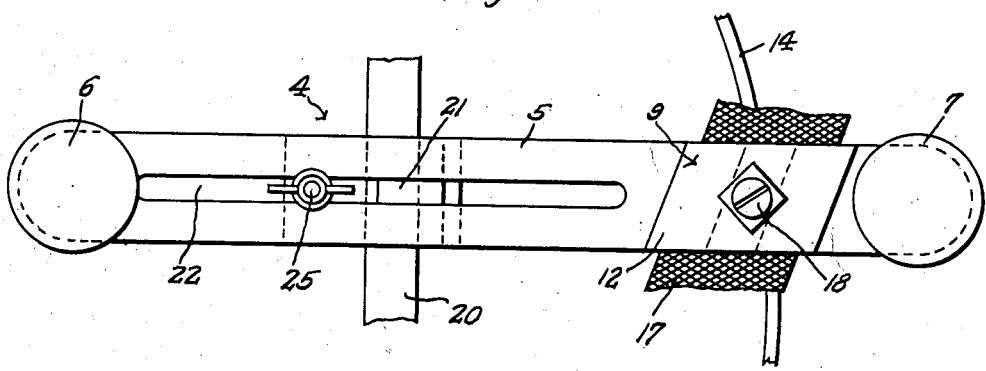
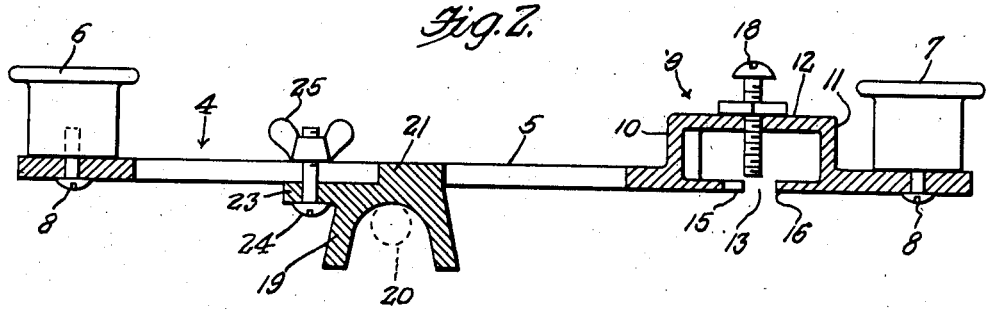
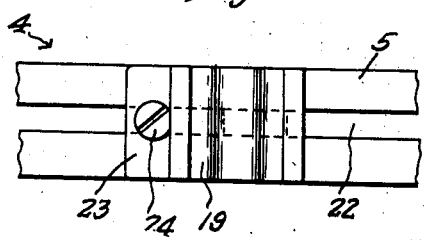
Inventor
John L. Davis,
By Clarence A. O'Brien
and Hyman Berman
Attorneys Patented May 23, 1939

2,159,552

UNITED STATES PATENT OFFICE 2,159,552

ADJUSTABLE LAWN MOWER SHARPENER

John L. Davis, Mobile, Ala.

Application April 26, 1938, Serial No. 204,438

1 Claim. (Cl. 76—82.1)

This invention relates to improvements in a sharpener device particularly adapted for sharpening the blades of a lawn mower.

The principal object of the invention is to provide a device of this character having means for holding and adjusting the file upon the cutting edges of the blades, and also to provide such a device which may be adjusted for use upon lawn mowers of different sizes.

A still further object of the invention is to provide a sharpener that may be mounted on the lawn mower and is adapted to engage the cutting blade to impart a rotary movement to the cutter reel as the file moves along the blade.

A still further object of the invention is to provide a device of this character which is characterized by its simplicity, durability, and inexpensiveness to manufacture.

Other objects and advantages of the invention will be apparent during the course of the following description.

With the foregoing in view the invention resides in a novel subject matter hereinafter described and claimed, the description being supplemented by the accompanying drawing in which:

Figure 1 is a top plan view of the sharpener constructed in accordance with the principles of my invention, and showing a file mounted therein.

Figure 2 is a longitudinal sectional view of the device, with certain parts in elevation.

Figure 3 is a fragmentary bottom plan view.

In the drawing wherein for the purpose of illustration is shown a preferred embodiment of the invention the numeral 4 generally denotes a file sharpener for sharpening the cutting blade of the rotary cutter, and includes an elongated operating bar 5 which is preferably made of cast metal. The opposite ends of the bar being provided with knobs 6 and 7 which are suitably secured to the operating bar 5 by means of bolts or the like 8. These knobs are used by the operator for manually moving the sharpener from one side of the lawn mower to the other. At one end of the operating bar 5 I provide a boxing generally designated by the numeral 9 having side walls 10 and 11 and a top member 12. One end of the operating bar 5 is cut away as at 13 to provide an opening to accommodate the edges of the blade 14 of a lawn mower. The opening 13 is diagonal to the longitudinal dimensions of the operating bar 5 to conform to the contours of the blade 14. Projecting toward each other from opposite sides of the bar 5 are shoulders 15 and 16 upon which the file designated by the numeral 17 is seated. In order to lock the file 17 in the boxing 9, I make use of a screw 18 which is seated in the top 12 of the boxing 9. When the screw 18 is tightened the file 17 is tightened against the shoulders 15 and 16 of the bottom of the boxing 9.

In the preferred form of construction I provide a saddle 19 which is adapted to seat upon the tie rod 20, which tie rod connects the side frames of a conventional lawn mower. The saddle 19 is provided with a stud 21, which is receivable in the elongated slot 22 of the operating bar 5, and this stud is adapted to slide longitudinally therein. The saddle 19 is provided with a lateral stud 23 which is disposed at right angles to the stud 21 and is centrally apertured to accommodate a bolt 24, which bolt passes through the opening 22 of the operating bar and is adjustably held in place by a butterfly nut 25.

The operation of the device is as follows:

The lawn mower is placed on a table or other support up side down, and the saddle 19 is then seated on the tie rod 20. The stud 21 is inserted in the elongated slot 22 of the operating bar and is adapted to slide longitudinally in said slot. The saddle 19 is adjusted on the operating bar 5 at predetermined point depending on the sides of the lawn mower to be sharpened, and is adjustably held in place by means of the bolt and nut 14 and 25 respectively. When the saddle is placed on the tie rod 20 of the lawn mower, the ensemble will assume a transverse position relative to the rotary cutter.

The file 14 is positioned in the boxing 9, and is firmly held in place by the clamping screw 18, which when tightened, forces the file tightly against the shoulders 19, thus holding the former firmly in place. The file holder is then placed on the blade 14 of the lawn mower by placing the blade in the diagonal opening 13. The operator by using the respective knobs 6 and 7 manually moves the sharpener from one side of the lawn mower to the other, the saddle 19 supporting one end of the sharpener on the tie rod, and as the file 14 moves over the cutting edge of the blade the rotary cutter is adapted to partially rotate, as the blade follows the sharpener. The sharpener is reciprocated from one side of the lawn mower to the other until the blade has been properly sharpened.

From the foregoing it will be seen that I produced a very novel and unique sharpener for sharpening the edges of a rotary cutter, and one which may be easily operated. Moreover, because of its extreme simplicity it may be assembled and adjusted and operated with a minimum of effort.

It is thought that persons skilled in the art to which the invention relates will be able to obtain a clear understanding of the invention after considering the description in connection with the drawing. Therefore, a more lengthy description is regarded as unnecessary.

Since excellent results are obtainable from the details disclosed, they are preferably followed. However, within the scope of the invention as claimed, numerous modifications may of course be made.

What is claimed is:

A lawn mower sharpener, the combination with a file, an operating bar having an elongated slot, a saddle adjustably mounted on one end of said bar, said saddle having a stud receivable in said slot and adapted to slide longitudinally therein, a lateral stud integrally formed on said saddle and disposed at right angles to the first-mentioned stud, said lateral stud having an opening communicating with the slot in said operating bar, a bolt passing through the aperture of the stud and the elongated slot of said bar and a nut associated with the bolt for holding the parts in assembled and adjustable position, the opposite end of said bar being provided with an integral boxing, said boxing extending upwardly above the operating bar, said boxing being open at each end to accommodate the file, and having a slotted diagonally extending opening in its bottom portion to expose a portion of the file for contact with the blade to be sharpened, said opening defining shoulders upon which the file is seated, and clamping means carried by the boxing for securing the file therein.

JOHN L. DAVIS.